Patented June 10, 1952

2,599,558

UNITED STATES PATENT OFFICE 2,599,558

METHOD OF REGENERATING ANION EXCHANGE MATERIALS AND COMPOSITION THEREFOR

Walter Juda, Cambridge, and Morris Carron, Boston, Mass., assignors, by mesne assignments, to Ionics, Incorporated, Cambridge, Mass., a corporation No Drawing. Application September 25, 1947, Serial No. 776,144

7 Claims. (Cl. 260—96)

This invention relates to an improved method of regenerating anion exchange materials and to compositions suitable for carrying out the method.

Anion exchangers in the active basic form are commonly used to remove relatively strong acids from water solutions. After exhaustion of the exchangers, the adsorbed acids on the exchanger may be removed by means of basic solutions. Thereby the exchangers are regenerated to the active base form and corresponding salts of the adsorbed acids are formed with the regenerant base. The latter are washed out of the regenerated basic exchange material, which is substantially insoluble.

In many applications, for example, in water purification practice, it is desirable to use only a relatively small fraction of pure water to make up solutions of the regenerant. Bases are commonly chosen which will form soluble salts with the strong acids commonly found in natural waters including, especially, sulfuric acid as well as hydrochloric acid and sometimes nitric acid. Accordingly, sodium hydroxide, sodium carbonate and ammonia are most commonly recommended in order to form such soluble salts. However, these alkalies are relatively expensive reagents.

It is an object of this invention to provide methods of regenerating to the active basic form conventional anion exchange resins which contain strong acids including sulfuric acid or other acids, such as phosphoric acid, by means of less expensive solutions. It is also a purpose of this invention to provide methods of preparing and recirculating such solutions through the exchanger in which the same amount of water can be used repeatedly. Other objects will appear from the following disclosure.

It is now found, in accordance with the present invention, that exhausted anion exchange materials, or partially exhausted anion exchange materials—and more especially anion exchange materials, in combination with an acid or acids, and therefore containing an acid such as phosphoric or sulfuric acid—may be regenerated with alkaline solutions containing alkaline earth metals, such as calcium hydroxide, even though such metals tend to form sparingly soluble phosphates or sulfates, and their solutions have heretofore been regarded as prohibited on this account.

In general, the invention comprises the step of percolating through the basic or "active" form of an anion exchange resin waters containing dissolved acids, such as phosphoric acid, sulfuric acid—(or other acids which form but sparingly soluble salts with the alkaline earth metals, notably calcium)—until the basic form of the exchange material is partially or substantially completely converted to the exhausted form. The bed of exchange material is then regenerated by means of a solution of a basic compound of an alkaline earth metal such as calcium hydroxide. In so doing, it is now found to be advantageous to pass the regenerant solution through the exchange material in a direction opposite to that in which the acidified waters (which have been purified thereby in causing exhaustion of the anion exchange materials), have been passed therethrough in exhausting the anion exchange material.

Preferably, therefore, the regenerant solution is passed through the exhausted anion exchange material in the direction of increasing degree or concentration of exhaustion (or acidification) of the exchanger bed. In this way it combines with the most intensively acidified portion of the exchange material last, and with the least strongly acidified portion of the exhausted exchanger bed first, and preferably in an upward direction.

The alkaline regenerant solution, as thus coming from the anion exchanger bed and containing its dissolved salts and suspended insoluble salts, may be mixed with fresh alkaline regenerant material, which will be dissolved therein, while the insoluble material may be removed by settling, decantation, filtering, etc. The clarified solution is then returned for re-use in regeneration of other exhausted anion exchange material.

When the thus re-used solution has accumulated a large concentration of soluble salts in this manner, or such that it will not dissolve an adequate amount of the alkaline earth metal in basic or hydroxide form, it may be treated for their separation, as by selective evaporation, crystallization, or the like.

When mixed solutions of strong acids, such as hydrochloric acid, nitric acid and sulfuric acid, are passed through an anion exchange bed in the basic form the divalent sulfuric acid is adsorbed preferentially over the univalent nitric and hydrochloric acids. As a result, if the solution is, for example, passed downward through the exchanger bed, the upper portion of the bed is preferentially converted by the sulfuric acid component and contains most of the sulfuric acid while the lower portion successively contains the nitric and hydrochloric acid.

If a lime solution is passed through this bed in the same direction as the acid water solution, (i. e., downward in this example) then calcium sulfate is formed and largely precipiated in the upper portions of the bed. The bed then acts as a filtering medium for this solution resulting in a rapid fouling of the bed. In fact, the calcium sulfate precipitates and forms a scale on the exchange granules which causes a rapid decrease in their further acid adsorption.

On the other hand, it is now discovered that when the lime solution is passed through the bed in the direction opposite to that of the acid containing waters, that is upward in this example, then the lime comes first successively into contact with hydrochloric and nitric acid in the exhausted exchange materials and forms primarily soluble calcium salts (the chloride and the nitrate), in the lower portions of the bed. The solution containing these soluble salts continues to travel upward through the bed without precipitation until it reaches the upper portion which contains the sulfuric acid. Here, sparingly soluble calcium sulfate is formed but instead of being pushed downward and caught by exchanger granules below it is now swept out of the top of the exchanger with the solution in back of it acting as a wash for the upper parts of the bed. We have found that by operating in this manner it is possible to use lime for the regeneration of beds containing sulfuric acid and other acids forming sparingly soluble calcium salts, such as phosphoric acid or phosphates.

The effluent from this bed thus is a solution of soluble calcium salts including calcium chloride and calcium nitrate, and the like. It also contains some calcium sulfate which is dissolved but most of the calcium sulfate is suspended. The calcium sulfate which comes out in solution appears to be in the form of a super-saturated solution with respect to calcium sulfate. To this solution is then added a further supply of lime and the resulting mixed solutions of calcium salts and calcium hydroxide (which precipitates most of the calcium sulfate previously maintained in the supersaturated solution) is then clarified, preferably by settling, followed by filtration of the decanted solution. At this point the solution contains appreciable amounts of lime and soluble calcium salts (chloride, nitrate, etc.). We have found that this solution is suitable for further regeneration of anion exchangers and that it may therefore again be passed through the exchanger bed for this purpose. The effluent regenerant then obtained will contain more soluble calcium salts and more suspended calcium sulfate. It may be subjected to the same treatment as described above and this re-cycling of it may be continued until no more acid is removable from the exchanger bed thereby. In this manner, even though lime is a base which is relatively sparingly soluble in water and also in calcium salt solutions the same amount of water has been used repeatedly and has therefore been instrumental in removing acids in chemical equivalent amounts far exceeding that of the lime soluble in this amount of water at any one pass.

At ordinary temperatures the solubility of $Ca(OH)_2$ is of the order of 1–1.5 grams per liter which amounts to only 1500–2400 p. p. m. as NaCl. Often the acidic solutions to be purified contain acids in concentrations of the same order of magnitude which would evidently render impractical the use of chemically equivalent volumes of lime solutions without reuse of the water content.

Therefore the recirculation of the same water in successive passes through the anion exchanger beds during regeneration is a substantial advantage which contributes significantly to its usefulness.

The following specific example illustrates how our invention may be carried out in practice; it is not to be construed in a limiting sense.

To prepare the basic form of a conventional synthetic aliphatic amine anion exchange resin—namely, a condensation polymer having active amine groups incorporated in the polymeric structure—a 250 gram portion of this exchanger, as received, was contacted in a 3 liter flask of 1500 cc. with a 7% solution of sodium carbonate for two hours. The exchanger was then collected on a Buchner funnel, washed with distilled water until the effluent was free from chloride and sulfate ions (silver nitrate and barium chloride tests) and had a pH of 7–8. The exchanger was then dried to constant weight at 80° C., cooled, screened and the 20/40 mesh portions were used for further tests.

The capacity of the above basic exchanger, $M'$, expressed in milliequivalents of acid absorbed per gram of bone dry exchanger (dried at 80° C.) was measured by converting samples of this basic form completely to the salt form; this was done by means of a large excess of sulfuric acid and nitric acid, respectively. The capacity, $M'$, expressed as milliequivalents of acid per gram of bone dry exchanger was found in this manner to be between 7.4–8.0.

A glass column, 14 inches long and 1⅛ inches internal diameter was packed with 6 cubic inches of this wet anion exchanger material in the basic sodium carbonate regenerated form, consisting of a conventional synthetic aliphatic amine anion exchanger resin (marketed under the name of DeAcidite by the Permutit Company and prepared in accordance with U. S. Patent No. 2,442,989). This volume of wet exchanger contained 15 grams of bone dry exchanger.

24.3 liters of an acid solution, A, containing 2.25 m. eq./1 of hydrochloric acid and 0.90 m. eq./1 of sulfuric acid, having a pH of 2.4, were percolated with downflow through the column at the rate of 70–80 cc./minute. The collected effluent had a pH of 5.0 showing that nearly 76.5 m. eq. of acids had been adsorbed by the exchanger. The distribution of the acids in the various portions of the exchanger bed was then determined as follows.

The column was divided into seven substantially equal segments, by volume, numbered from top to bottom; the contents of each segment were then regenerated with known amounts of 0.519 N sodium carbonate solution (given in Table I, column 2, expressed as milliequivalents) in 125 ml. Erlenmeyer flasks, filtered and washed free of excess sodium carbonate. The filtrate and wash waters were then combined and made up to the mark in 250 ml. volumetric flasks. Each of these solutions was analyzed for total acid, sulfate, and chloride, the results being listed in Table I.

In order to determine the acid content of each segment, the exchanger therein was treated with and excess of the sodium carbonate solution, filtered and washed, as described, and the excess of sodium carbonate determined by back titration of an aliquot portion of the measured solution, with standard acid. (Table I, column 3.)

To determine the chloride content of each segment, another aliquot portion of the 250 ml. solution was first acidified with dilute nitric acid, and titrated to a salmon pink with 0.0256 N silver nitrate solution using saturated potassium chromate as indicator (Table I, column 6.)

To determine the sulfate content of each segment, aliquots of the 250 ml. solutions were acidified with hydrochloric acid to a methyl orange endpoint, heated to boiling, and the barium sulfate precipitated with sufficient 10% barium chloride solution at the boiling point, digested, quantitatively collected on tared Gooch crucibles, dried, weighed, and calculated as m. eq. sulfuric acid per segment (Table I, column 7.)

TABLE I

| Segment No. | M. eq. $Na_2CO_3$ Added | M. eq. $Na_2CO_3$ Excess | Grams Bone Dry Exchanger per segment | Total m. eq. acid per segment, by difference | M. eq. HCl ($AgNO_3$ test) | M. eq. $H_2SO_4$ ($BaCl_2$ Gooch) |
|---|---|---|---|---|---|---|
| 1 | 25.95 | 4.07 | 3.12 | 20.88 | 2.53 | 19.91 |
| 2 | 20.76 | 10.03 | 1.78 | 10.73 | 8.10 | 1.93 |
| 3 | 20.76 | 12.32 | 1.67 | 8.44 | 8.46 | None |
| 4 | 20.76 | 11.40 | 2.08 | 9.36 | 9.33 | None |
| 5 | 20.76 | 11.53 | 2.55 | 9.23 | 9.25 | None |
| 6 | 20.76 | 11.99 | 1.94 | 8.77 | 8.79 | None |
| 7 | 20.76 | 12.44 | 1.84 | 8.32 | 8.19 | None |
| Total | | | | 75.73 | 54.65 | 21.84 |

It can be seen from Table I that the sulfuric acid is preferentially removed over the hydrochloric acid and such selective removal is localized at the top of the column, that is, at that portion of the exchanger which first meets the incoming acid solution mixture.

The column was reassembled, the exchanger wetted with distilled water and replaced in the column regenerated with sodium carbonate as described above and exhausted with downflow by 25 liters of the same $HCl$—$H_2SO_4$ solution, A, which contained 78.75 milliequivalents of acids at a rate of 80 cc./min. to attain a pH of 5. This shows that nearly 78.8 m. eq. of acids had been adsorbed by the exchanger.

The exhausted bed was next regenerated by upflow of 1000 cc. of a clear aqueous solution of calcium hydroxide, B, which was passed through the column in multiple passes. Table II, pass numbers, 1, 2 and 3 give the data of this first lime regeneration.

The column now in the active form was washed with 3.5 liters of distilled water until the effluent had a pH of 8 and was free of any calcium salts (oxalate test) and then the exchanger was again contacted downflow with 23.2 liters of acid solution A at the rate of 60 cc./min. This shows that nearly 73.1 m. eq. of acids had been adsorbed by this lime-regenerated exchanger and that therefore this exchanger was effective in removing substantially the same amount of acids as the sodium carbonate regenerated exchanger. Again the column was regenerated by upflow in three passes (pass 4, 5 and 6) with 1000 cc. of a clear lime solution C. The solution C was made by dissolving more lime in the effluent of pass 3, which contains the dissolved calcium salts removed from the exchanger in passes 1, 2 and 3 and filtering. Each pass involved 1000 cc. of the regenerant solution which was passed through the bed in opposite direction to that of the acid solution, i. e., in such a manner that it left the bed after traveling through the column at the point where the acid solution A had previously entered. In Table II, passes 4, 5 and 6 give the results of this regeneration.

TABLE II

*Lime regeneration*

| Pass No. | Influent Regenerating Lime Solution | | Effluent Regenerating Solution |
|---|---|---|---|
| | pH m.eq./l | $Ca(OH)_2$ | pH |
| 1 | 12.4 | 44.8 | 2.8 |
| 2 | 12.1 | 39.2 | 3.1 |
| 3 | 12.1 | 43.2 | 12.0 |
| 4 | 12.1 | 40.8 | 2.8 |
| 5 | 12.2 | 40.1 | 9.0 |
| 6 | 12.2 | 41.5 | 11.9 |
| 7 | 12.1 | 42.7 | 9.5 |
| 8 | 12.0 | 40.3 | 11.1 |
| 9 | 12.1 | 40.9 | 11.8 |

After pass number 6 the bed was washed free of calcium salts (oxalate test) until the effluent had a pH of 8 by 3.0 liters of distilled water.

The solubility of lime at ordinary temperatures in calcium chloride solutions (Table III) is sufficient to repeat recycling until the concentrations of calcium chloride of much more than 10% are reached. Even at 30% calcium chloride the solubility of lime is 43.9 m. eq. $Ca(OH)_2$ per liter at 20° C.

TABLE III

| Temp. | Grams $Ca(OH)_2$ per 100 cc. $CaCl_2$ Solution | | | | | | |
|---|---|---|---|---|---|---|---|
| | 0% | 5% | 10% | 15% | 20% | 25% | 30% |
| 20° C | .1374 | .1370 | .1661 | .1993 | [1].1857 | [1].1661 | [1].1630 |
| 40° C | .1162 | .1160 | .1419 | .1781 | [1].2249 | [1].3020 | [1].3684 |

Table III taken from: J. W. Mellor, A Comprehensive Treatise on Inorganic and Theoretical Chemistry, p. 679, 1923, Longmans, Green & Co., N. Y.

[1] Results affected by separation of oxychloride which lowered the amount of dissolved calcium chloride.

To show the effect of passing the regenerant and acid mixture through the exchanger in the same direction, the regenerated bed was now exhausted, with downflow, by 250 cc. of solution D, containing 24.83 m. eq. of sulfuric acid and 49.73 m. eq. of hydrochloric acid. This solution D was chemically equivalent to 23.65 liters of acid solution A. The effluent was collected (240 cc.) and 10 cc. required but one drop of .0135 N NaOH to realize a pH of 7. 1000 cc. of the effluent of pass number 6, Table II was recharged by dissolving more lime, filtered, and repassed through the bed with downflow. The results are given in Table II, passes numbers 7, 8 and 9.

It was observed that the effluent of the regenerant solution in passes 1, 2 and 3 and 4, 5 and 6 were turbid, indicating the presence therein of undissolved calcium sulfate, whereas the effluent of pass 7, 8 and 9 were clear solutions and the upper part (about ⅓) of the exchanger in the column which contained the sulfate was lighter in color due to the retention therein of precipitated calcium sulfate. The effect of this precipitation is seen by comparing in Table II, passes 7 and 8 with passes 1 and 2 and passes 4 and 5. While with flow in opposite directions, the surface of the exchanger particles are continuously available for reaction with lime, thereby consuming it efficiently, they were coated with precipitated calcium sulfate in the flow in the same direction which decreased proper contact and caused the inefficiency of regeneration shown in Table II.

It should be understood that the present disclosure is for the purpose of illustration only and that this invention includes all modifications and equivalents which fall within the scope of the appended claims.

We claim:
1. Method of treating anion exchange materials, a localized top portion of which is in combination with an acid which forms an insoluble salt with an alkaline earth metal and a lower portion of which is in combination with an acid which forms soluble salts with alkaline earth metals, to regenerate the same to basic form, comprising the step of circulating an aqueous solution of alkaline earth metal hydroxide upward through said anion exchange material.

2. Method of treating anion exchange materials, a localized top portion of which is in combination with an acid which forms an insoluble salt with calcium and a lower portion of which is in combination with an acid which forms soluble salts with calcium, to regenerate the same to basic form, comprising the step of circulating an aqueous solution of calcium hydroxide upward through said anion exchange material.

3. Method of treating a synthetic aliphatic amine anion exchange material, a localized top portion of which is in combination with an acid selected from the group consisting of phosphoric and sulfuric and a lower portion of which is in combination with hydrochloric acid, to regenerate the same to basic form, comprising circulating an aqueous solution of calcium hydroxide upward through said anion exchange material.

4. Method of treating anion exchange materials, a localized top portion of which is in combination with an acid selected from the group consisting of phosphoric and sulfuric and a lower portion of which is in combination with an acid which forms soluble salts with alkaline earth metals, to regenerate the same to basic form, comprising circulating an aqueous solution of an alkaline earth metal hydroxide upward through said anion exchange material.

5. Method of treating anion exchange materials, a localized top portion of which is in combination with an acid selected from the group consisting of phosphoric and sulfuric and a lower portion of which is in combination with an acid which forms a soluble calcium salt, to regenerate the same to basic form, comprising circulating an aqueous solution of calcium hydroxide upward through said anion exchange material.

6. Method of treating anion exchange materials, a localized top portion of which is in combination with an acid selected from the group consisting of phosphoric and sulfuric and a lower portion of which is in combination with an acid which forms soluble salts with alkaline earth metals, to regenerate the same to basic form, comprising circulating an aqueous solution of an alkaline earth metal hydroxide upward through said anion exchange material adding more alkaline earth metal hydroxide to the effluent regenerant therefrom, filtering said effluent regenerant and circulating the filtered solution again through such a bed of anion exchange resin.

7. Method of treating anion exchange materials, a localized top portion of which is in combination with an acid selected from the group consisting of phosphoric and sulfuric and a lower portion of which is in combination with an acid which forms a soluble calcium salt, to regenerate the same to basic form, comprising circulating an aqueous solution of calcium hydroxide upward through said anion exchange material adding more calcium hydroxide to the effluent regenerant therefrom, filtering said effluent regenerant and circulating the filtered solution again through such a bed of anion exchange resin.

WALTER JUDA.
MORRIS CARRON.

REFERENCES CITED

The following references are of record in the file of this patent:

UNITED STATES PATENTS

| Number | Name | Date |
| --- | --- | --- |
| 2,413,791 | Shafor | Jan. 7, 1947 |

OTHER REFERENCES

Ser. No. 359,575, Smit (A. P. C.), published May 11, 1943.